United States Patent
Kish

[11] Patent Number: 5,209,612
[45] Date of Patent: May 11, 1993

[54] CUTTING TOOL

[75] Inventor: William S. Kish, Riverview, Mich.

[73] Assignee: The Budd Company, Troy, Mich.

[21] Appl. No.: 858,896

[22] Filed: Mar. 27, 1992

[51] Int. Cl.[5] ............................................ B23C 5/10
[52] U.S. Cl. ................................. 407/54; 407/61
[58] Field of Search ............... 407/53, 54, 120, 34, 407/42, 61; 408/224, 225, 230, 144; 76/108 R; 144/221

[56] References Cited

U.S. PATENT DOCUMENTS

| | | | |
|---|---|---|---|
| 748,890 | 1/1904 | Taylor et al. | 408/224 |
| 2,846,902 | 8/1958 | Cowley | 76/108.1 X |
| 3,089,353 | 5/1963 | Craven | 76/108.1 |
| 3,125,931 | 3/1964 | Stanaback | 76/108.1 X |
| 4,095,491 | 6/1978 | Hildbrandt | 76/108 R |
| 4,116,580 | 9/1978 | Hall et al. | 407/54 X |
| 4,356,873 | 11/1982 | Dziak | 175/410 |
| 4,381,162 | 4/1983 | Hosoi | 408/230 X |
| 4,411,563 | 10/1983 | Moon | 408/224 X |
| 4,712,948 | 12/1987 | Kidani | 407/42 |
| 4,893,968 | 1/1990 | Levy | 407/54 |
| 5,020,394 | 6/1991 | Nakamura et al. | 76/108.6 |
| 5,026,227 | 6/1991 | Nishi et al. | 407/119 |
| 5,066,170 | 11/1991 | Berryer | 407/54 |

Primary Examiner—Steven C. Bishop
Attorney, Agent, or Firm—Harness, Dickey & Pierce

[57] ABSTRACT

A cutting tool which can be used for milling metals, metal alloys and for woodworking. The cutting tool includes a shaft which is attachable to means of rotation and a head portion provided with multiple cutting edges. The cutting tool is capable of cutting in any direction and allows for cutting at increased speeds.

11 Claims, 2 Drawing Sheets

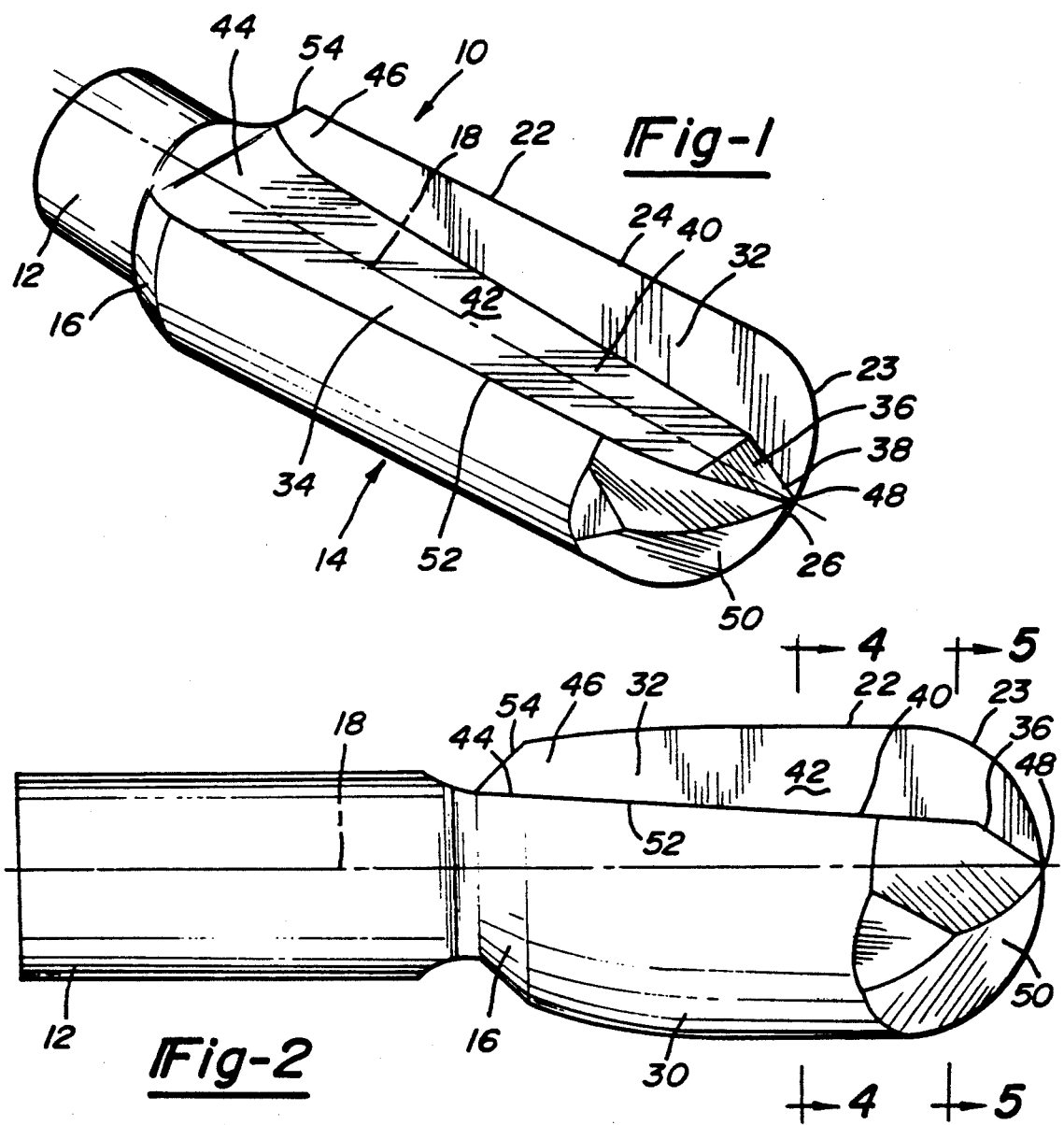
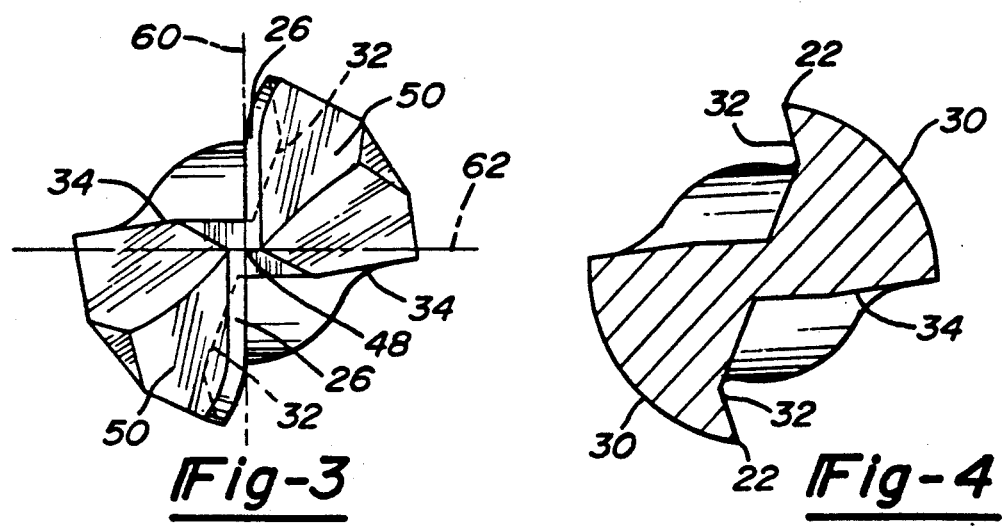

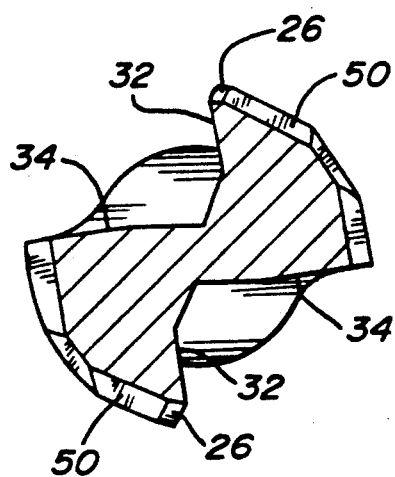
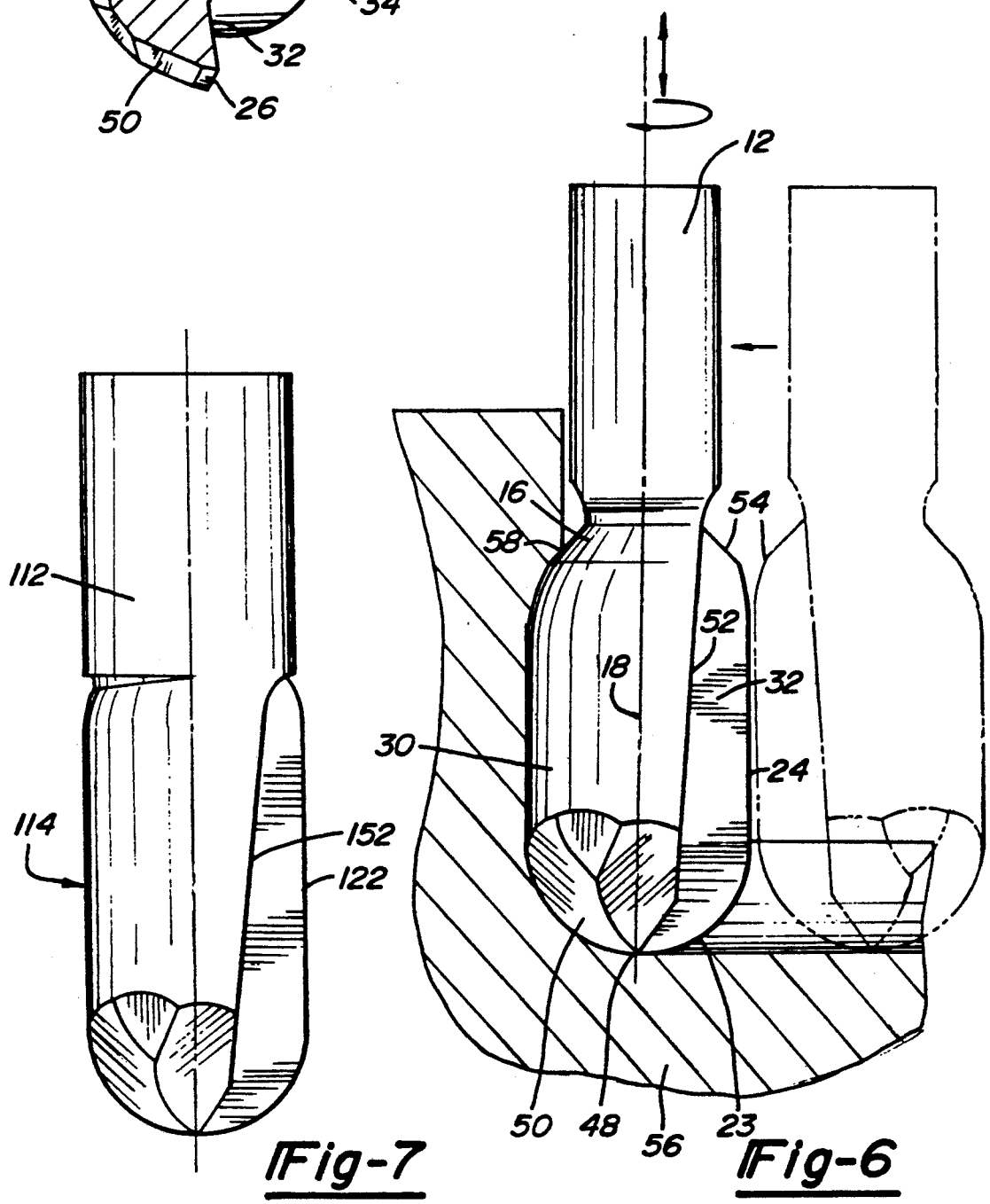

CUTTING TOOL

BACKGROUND OF THE INVENTION

1. Technical Field

This invention relates to cutting tools and, more particularly, to a cutting tool for use with milling machines.

2. Discussion

In the milling industry, various types of metal cutting tools are adaptable to be used with milling machines to form parts having a specific contour.

The present invention is primarily concerned with providing a cutting tool which allows for increased operating speeds without detracting from the finished quality of the part being milled. Generally, with the cutting tools which are presently available, surface quality is available only if the cutting tools is rotated at a reduced speed. Additionally, presently available cutting tools are incapable of milling deep surfaces as the cutting tool is drawn upwardly.

One of the advantages of the present invention is the increased milling speeds which are available.

Another advantage of the present invention is a smoother surface finish.

A further advantage of the present invention is that the cutting tool allows for milling in both the upward and downward directions as well as side to side.

Yet another advantage of the present invention is less machine down time to change milling heads since a single cutting tool can be used for milling along the x, y and z axis.

Yet another advantage of the present invention is the quick evacuation of chips away from the surface being milled.

SUMMARY OF THE INVENTION

In accordance with the teachings of the present invention, a cutting tool is disclosed which can be used in a milling or woodworking operation. The cutting tool has an elongated body having a shank which is attachable to a milling or woodworking machine and a head portion which is provided with a plurality of cutting edges which allow for cutting in virtually any direction. Preferably, the head portion includes a web and a pair of flutes, the flutes being defined by the area located between first and second mutually orthogonal walls. The first wall diverges rearwardly from the web at angle of approximately 10° relative to a first longitudinal plane. This first wall terminates at the outer surface of the cutting tool to provide a first cutting edge having a forward cutting portion and a rearward cutting portion. The forward cutting portion is arcuate and has a radius which extends from the web to an axial cutting portion. The axial cutting portion extends rearwardly and converges toward the first longitudinal plane at an angle of approximately 10°. The outer surface of the head portion tapers radially inwardly to define a neck surface adjacent to the shank. Rearward portions of the first and second walls are cut into the neck surface to define a rear cutting edge.

BRIEF DESCRIPTION OF THE DRAWINGS

The various advantages of the present invention will become apparent to those skilled in the art after having the benefit of reading the following specification and by reference to the drawings in which:

FIG. 1 is a perspective view of a first embodiment of the present invention;

FIG. 2 is a side view of the embodiment of FIG. 1;

FIG. 3 is an end view of the embodiment of FIGS. 1 and 2;

FIG. 4 is a cross-sectional view of FIG. 2 through Line 4—4;

FIG. 5 is a cross-sectional view of FIG. 2 through Line 5—5;

FIG. 6 is a side view of the first embodiment showing the various cutting edges engaged against a work piece; and FIG. 7 is a side view of a second embodiment of the present invention.

DESCRIPTION OF THE PREFERRED EMBODIMENTS

FIG. 1 is a side view of a first embodiment of the cutting tool 10 of the present invention. The cutting tool 10 includes a shank 12 which is attachable to a machine (not shown) which rotates the cutting tool. A head portion 14 includes first and second symmetrical flutes 42 converging at the forward end of the cutting tool. The flutes 42 define the areas located between first and second orthogonal walls 32 and 34, respectively. The first wall 32 terminates at the outer surface 30, thereby forming the first cutting edge 22. The first cutting edges 22 located on both symmetrical halves of the head portion adjoin at the top to form a narrow web 48. The central longitudinal axis 18 extends through the center point of the web 48 and is defined by the intersection of first 60 and second 62 longitudinal planes as shown in FIG. 3.

This first wall 32, which is relatively flat, diverges from the web 48 rearwardly at an angle of about 10° relative to the first longitudinal plane 60. The second wall 34 includes a first triangular shaped surface 36 and a second surface 40 extending downwardly from the first triangular surface. A first corner 38 of the triangular shaped surface 36 converges at the web 48. The trailing end 44 of the second surface 40 is curved outwardly away from the central longitudinal axis 18 to assist in the evacuation of chips.

The first cutting edge 22 includes a forward cutting portion 23 and an axial cutting portion 24. The forward cutting portion 23 is defined by an arc having a given radius which extends from the web 48 down to an axial cutting portion 24. Forward cutting portion 23 is further provided with a lip 26 which diverges rearwardly away from the first longitudinal plane 60 at an angle of approximately 10°. The width of each lip 26 is generally equal to about 5 percent of the head portions maximum outer diameter. The axial cutting portion 24 extends rearwardly from the forward cutting portion 23 and converges toward the first longitudinal plane 60 at an angle of approximately 10°.

Cutting tool 10 is also provided with a clearance section 50 located behind and adjacent to the lip 26. This clearance section 50 is essential to provide chip clearance. Although the present embodiment is shown with a plurality of clearance surfaces, it will be understood that a single clearance surface could be utilized. To further assist in the evacuation of chips, the outer non-cutting surface 52, provided at the point where the second wall 34 terminates with the outer surface 30, is relieved radially inwardly relative to the first cutting edge 22. This radial relief of surface 30 is essential to prevent a condition known in the industry as "chattering".

As more clearly shown in FIGS. 2 and 6, the embodiment of FIG. 1 is further provided with a neck surface 16 located along the length of the cutting tool where the outer surface 30 of the head portion 14 tapers radially inwardly adjacent to the shank 12. The rearward portions of the first and second walls, 46 and 44, respectively, are cut into the neck surface to form rear cutting edges 54. These rear cutting edges 54 provide the cutting tool with the ability to cut the workpiece as the tool is directed upwardly. Preferably this neck surface 16 tapers radially inwardly at an angle of approximate 45° relative to the first and second longitudinal planes 60 and 62, respectively.

Referring to FIG. 3, an end view of the embodiment of FIGS. 1, 2 & 6 is shown. The thin web 48 is shown to occur at the point where the lips 26 and the corners 38 of the triangular shaped surface 36 come together. It is essential that the web 48 be relatively narrow in order to give an improved surface finish. The first triangular shaped surface 36 diverges rearwardly away from the second longitudinal plane 62 at an angle of approximately 30° to allow for additional clearance at the top of the first walls 32. The second surface 40 of second walls 34 diverges rearwardly away from the second longitudinal plane 60 at an angle of approximately 10°. The broken lines represent the first inner walls 32 and further demonstrate that the first inner walls 32 diverge rearwardly at an angle of approximately 10° relative to the first longitudinal plane 60.

FIG. 4 is a cross-sectional view taken along line 4—4 of FIG. 2 and FIG. 5 is a cross-sectional view taken along line 5—5. The cross-sectional views of FIGS. 4 and 5 demonstrate that the width of the first inner walls 32 increase and the width of the second inner walls 34 decrease along the length of the head portion 14 in the direction of the forward end.

Referring to FIG. 6, a side view of the embodiment of FIGS. 1 and 2 demonstrating the various cutting edges engaging a workpiece 56 is shown. Initially, cutting in the forward direction begins as the web 48 engages the workpiece 56. The area of the cut increases as the forward end of cutting tool 10 is driven downward until the cutting tool has been inserted to its maximum diameter. The cutting tool 10 can be rotated sideways over the surface of the workpiece to further increase the area of the cut. Both the forward cutting portion 23 and the axial cutting portion 24 engage the workpiece 56 when cutting occurs from side to side at a depth below the point where the forward cutting portion 23 and the axial cutting portion merge 24. Unlike other known cutting tools, the embodiment of FIGS. 1, 2 & 6 also allow for cutting along the rear cutting edge 54 as the cutting tool 10 is moved upwardly against a surface 58 of the workpiece 56. It should be apparent to one of ordinary skill in the art that the geometry of the cutting tool 10 also allows for cutting along a diagonal plane.

Referring to FIG. 7, a side view of a second embodiment of the present invention is shown. This embodiment is essentially the same as the embodiment of FIGS. 1, 2 & 6 except that the rear cutting edge of FIGS. 1, 2 & 6 is not provided. In the embodiment of FIG. 7, the shank 112 and the head portion 114 have substantially the same outer diameter although similar diameters are not essential. Again, the non-cutting edge 152 is provided with radial relief relative to the first cutting edge 122.

Importantly, it should be noted that the length and diameter of the head portion of the present invention can be varied somewhat without changing the geometric angles of incident of the present invention. It is contemplated that cutting tools embodying the features of the present invention having an increased length relative to the diameter will typically be utilized for end milling operations and cutting tools having a shorter length relative to the outer diameter may be utilized for deep cavity machining such as die sinking.

The cutting tools of the present invention are generally made from hardened steel, such as M2 high speed steel and can be formed with a coating material such as titanium nitride which provides the cutting tool with even harder cutting edges. As a result of the unique geometry of the present invention, it has been discovered that milling operations can be run at very high speeds while providing excellent surface finish. For example, in test runs using a 1.0 inch diameter cutter carried out on a flat alloyed workpiece comprising approximately 4% Al and 96% Zn, it has been discovered that, at 8,000 rpm's, the cutting tools of the present invention can be advanced approximately 400 inches/minute along a straight line at a depth of about 3.0 inches.

Those skilled in the art will now come to appreciate some of the advantages of the present invention. The cutting tool of the present invention allows for faster milling or woodworking operations because of the unique geometry of the cutting, without sacrificing surface quality. The present invention also allows for cutting or milling in virtually any direction. The skilled practitioner will realize still other advantages of the invention after having the benefit of studying the specification, drawings and following claims.

What is claimed is:

1. A cutting tool, comprising:
an elongated tool body having a shank attachable to means of rotation; and
a head portion having a plurality of cutting edges; a central longitudinal axis occurring along an intersection of first and second longitudinal planes; a web on a forward end of the head portion; and a flute defined by an area located between mutually orthogonal first and second walls, said first wall diverging from said web rearwardly at an angle of about 10° relative to said first longitudinal plane, the first wall terminating at the outer surface to provide a first cutting edge having a forward cutting portion and an axial cutting portion, the forward cutting portion being defined by an arc of a given radius extending from the web to the axial cutting portion, the axial cutting portion extending rearwardly and converging toward the longitudinal axis at an angle of about 10° relative to said first longitudinal plane, said second wall terminating at an outer non-cutting surface which is relieved radially inwardly relative to the cutting edge of the first wall.

2. The cutting tool of claim 1, wherein the outer surface of the head portion tapers radially inwardly to define a neck surface adjacent to the shank, rearward portions of the first and second walls being cut into the neck surface to define a rear cutting edge whereby said rear cutting edge allows for cutting as said cutting tool is directed upwardly.

3. The cutting tool of claim 2, further comprising a second flute symmetrical to said first flute.

4. The cutting tool of claim 3, wherein said forward cutting portion is provided with a lip diverging rearwardly away from said first longitudinal plane.

5. The cutting tool of claim 4, wherein said lip diverges at an angle of approximately 10° relative to said first longitudinal plane.

6. The cutting tool of claim 4, wherein a clearance section is located behind said lip, said clearance section being relieved therefrom.

7. The cutting tool of claim 1, wherein said second wall further comprises a first surface and a second surface, said first surface which has a triangular shape includes one corner merging into said web, said first surface diverging rearwardly and radially at an angle of approximately 30° outwardly relative to said second longitudinal plane.

8. The cutting tool of claim 7, wherein the second surface of said second wall diverges rearwardly and radially outwardly at an angle of approximately 10° relative to said second longitudinal plane.

9. The cutting tool of claim 2, wherein the neck surface is tapered radially inwardly at an angle of approximately 45° relative to said first and second longitudinal planes.

10. The cutting tool of claim 2, wherein said cutting tool is comprised of hardened steel.

11. The cutting tool of claim 11, wherein the head portion of said cutting tool is coated with titanium nitride.

* * * * *